United States Patent
Shimamura et al.

(10) Patent No.: US 9,500,241 B2
(45) Date of Patent: Nov. 22, 2016

(54) DISK BRAKE PAD AND DISK BRAKE APPARATUS

(71) Applicant: Akebono Brake Industry Co., Ltd., Tokyo (JP)

(72) Inventors: Kenichi Shimamura, Tokyo (JP); Shotaro Note, Tokyo (JP); Yoshio Totsuka, Tokyo (JP)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 50 days.

(21) Appl. No.: 14/534,484

(22) Filed: Nov. 6, 2014

(65) Prior Publication Data
US 2015/0122597 A1 May 7, 2015

(30) Foreign Application Priority Data
Nov. 7, 2013 (JP) .................. 2013-230814

(51) Int. Cl.
  *F16D 65/092* (2006.01)
  *F16D 55/225* (2006.01)
  *F16D 65/097* (2006.01)
  (Continued)

(52) U.S. Cl.
  CPC .......... *F16D 65/092* (2013.01); *F16D 55/225* (2013.01); *F16D 55/228* (2013.01); *F16D 65/0006* (2013.01); *F16D 65/095* (2013.01); *F16D 65/0978* (2013.01); *F16D 2055/007* (2013.01)

(58) Field of Classification Search
  CPC .. F16D 65/092; F16D 55/225; F16D 55/228; F16D 65/006; F16D 65/095

USPC .................... 188/73.36, 73.31, 73.44, 250 R
See application file for complete search history.

(56) References Cited

U.S. PATENT DOCUMENTS

| | | | | |
|---|---|---|---|---|
| 4,817,764 A | * | 4/1989 | Stoka | F16D 55/2265 188/250 R |
| 6,186,288 B1 | * | 2/2001 | Baba | F16D 65/0972 188/73.36 |

(Continued)

FOREIGN PATENT DOCUMENTS

| | | |
|---|---|---|
| EP | 0971146 A2 | 1/2000 |
| JP | 57040130 A * | 3/1982 |

(Continued)

OTHER PUBLICATIONS

Extended European Search Report dated Sep. 2, 2015 from corresponding European Application No. 14192030.6 (6 pages).

*Primary Examiner* — Melanie Torres Williams
(74) *Attorney, Agent, or Firm* — Drinker Biddle & Reath LLP

(57) ABSTRACT

A disk brake pad includes a lining and a back plate supporting the lining. A first side part of the back plate in the circumferential direction includes a guided portion configured to engage movably in the axial direction with a guiding portion of a pad support member. The guided portion is disposed at a position more inward in the radial direction than a line of action of a brake tangential force applied in braking, so as to support a brake tangential force applied toward a second side part of the back plate in the circumferential direction in braking. The back plate is configured to support a brake tangential force applied toward the first side part in braking at a portion thereof that exists more outward in the radial direction than the line of action of the brake tangential force.

14 Claims, 17 Drawing Sheets

(51) Int. Cl.
 *F16D 65/00* (2006.01)
 *F16D 55/228* (2006.01)
 *F16D 65/095* (2006.01)
 *F16D 55/00* (2006.01)

(56) References Cited

U.S. PATENT DOCUMENTS 6,296,085 B1 * 10/2001 Yukoku ............... F16D 65/0972
 188/73.36
2006/0060430 A1  3/2006 Schog et al.
2007/0240946 A1  10/2007 Schorn et al.
2010/0236878 A1  9/2010 Maehara
2013/0213747 A1 *  8/2013 Scotti .................... F16D 55/228
 188/73.31
2015/0101895 A1 *  4/2015 Ueda ..................... F16D 55/228
 188/72.4

FOREIGN PATENT DOCUMENTS

JP  2006-520449 A    9/2006
JP  2007-528468 A   10/2007
JP  2008261411 A  * 10/2008

* cited by examiner

DISK BRAKE PAD AND DISK BRAKE APPARATUS

BACKGROUND

The invention relates to an improved disk brake pad incorporated in a disk brake apparatus used to brake a vehicle such as an automobile and an improved disk brake apparatus. Specifically, the invention aims at realizing a structure which can prevent the generation of abnormal sounds called brake squeals and also can effectively prevent the occurrence of clonk sounds (click sounds).

In a disk brake apparatus used to brake a vehicle, a pair of pads are disposed to sandwich between them a rotor rotatable together with wheels and, in braking, the two pads are pressed against the two side surfaces of the rotor. The basic structure of such disk brake apparatus includes two kinds of structures of a floating type and an opposed piston type. FIGS. 15 to 19 show, of these two kinds of disk brake apparatuses, an example of the conventional structure of a floating caliper type of disk brake apparatus disclosed in the patent document 1.

Here, in the present specification and claims, "axial direction", "circumferential direction" and "radial direction" respectively mean the axial direction, circumferential direction and radial direction of the rotor unless otherwise stated in a state where a disk brake pad is assembled to a disk brake apparatus. Further, "entrance side" means the side of the caliper where the rotor rotating together with the wheels enters the caliper, while "escape side" means the side where the rotor comes off from the caliper.

In the disk brake apparatus of the conventional structure, a caliper 3 is supported shiftably in the axial direction on a support 2 fixed to a vehicle body while it is opposed to the inner side surface of a rotor 1. Thus, on the circumferential-direction two end portions of (the inner side portions 6 to be discussed later) of the support 2, there are provided slide pins 4a, 4b while they project inwardly. The slide pins 4a, 4b are respectively engaged with a pair of support arm portions 5 projectingly formed in the circumferential-direction two sides of the caliper 3, thereby supporting the caliper 3 shiftably in the axial direction on the support 2.

The support 2 is constituted of an inner side portion 6 disposed on the inner side of the rotor 1 and an outer side portion 7 on the outer side, while they are connected together in their respective circumferential-direction two ends by a pair of connecting arm portions 8a, 8b disposed to straddle over the rotor 1. To the circumferential-direction two ends of the inner side and outer side portions 6 and 7, there are fixed pad pins 9a, 9b, 10a and 10b while they extend in the axial direction. On the other hand, inner side and outer side pads 11a, 11b are respectively constituted of linings 12, 12 and back plates 13, 13 attached to and supported on the backs of the linings 12, 12 and, in the circumferential-direction two ends of the back plates 13, 13, there are formed through holes 14a, 14b respectively. The pad pins 9a, 9b (10a, 10b) supported by the support 2 are loosely engaged into the respective through holes 14a, 14b. With this structure, the two pads 11a, 11b are supported movably in the axial direction on the support 2.

The caliper 3 includes a cylinder portion 15 and a caliper pawl 16 while they sandwich the two pads 11a, 11b from the axial-direction two sides. The cylinder portion 15 incorporates therein a piston 17 for pressing the inner-side pad 11a toward the rotor 1.

When enforcing braking, pressure oil is fed into the cylinder portion 15 to allow the piston 17 to press the inner-side pad 11a against the inner side surface of the rotor 1. Then, as the reaction of this pressing force, the caliper 3 is shifted in the axial direction (toward the inner side), whereby the caliper pawl 16 presses the outer-side pad 11b against the outer side surface of the rotor 1. Thus, the rotor 1 is strongly held from both sides to thereby enforce braking.

In the disk brake apparatus of the above conventional structure, using the paired pad pins 9a, 9b, 10a, 10b respectively disposed in the axial direction, the two pads 11a, 11b are supported movably in the axial direction on the support 2. Thus, the shapes of the two pads 11a, 11 b and support 2 can be formed symmetric with respect to their respective circumferential directions. This has an advantage in reducing the manufacturing cost of the disk brake apparatus.

However, in the disk brake apparatus of the above conventional structure, in braking, an abnormal sound called a clonk sound (click sound) is easy to occur. The reason for this is described with reference to FIG. 19.

When the rotation direction of the rotor 1 in the forward run of a vehicle is counterclockwise in FIG. 19, in braking, a brake tangential force F1 going toward the other side (in FIG. 19, the left side, escape side) in the circumferential direction is applied to the friction surface center A point of the lining 12 constituting the pad 11a. And, the pad 11a is slightly moved toward the other side in the circumferential direction, whereby the through hole 14a of the circumferential-direction one end portion (entrance side end portion) of the back plate 13 is engaged with the pad pin 9a fixed to the circumferential-direction one side portion of the support 2 to thereby support the brake tangential force F1 (that is, a so called pull anchor structure is established). Here, since the engagement portion between the through hole 14a and pad pin 9a is situated more inward in the radial direction than the action line of the brake tangential force F1, in the forward-run braking, to the pad 11a, there is applied the moment M1 based on the brake tangential force F1 to rotate the pad 11a counterclockwise.

On the other hand, in the vehicle backward-run braking, a brake tangential force F2 going toward the circumferential-direction one side (in FIG. 19, right side) is applied to the friction surface center A point. The pad 11a is slightly moved toward the circumferential-direction one side (entrance side) and the through hole 14b of the circumferential-direction other end portion of the back plate 13 is engaged with the pad pin 9b fixed to the circumferential-direction other end portion of the support 2 to thereby support the brake tangential force F2 (that is, a so called pull anchor structure is established). Here, since the engagement portion between the through hole 14b and pad pin 9b is situated more inward in the radial direction than the action line of the brake tangential force F2, in backward-run braking, to the pad 11a, there is applied the moment M2 based on the brake tangential force F2 to rotate the pad 11a clockwise.

Thus, in the disk brake apparatus of the conventional structure, the direction of the moment acting on the pad 11a (11b) in the forward-run braking and the direction of the moment acting on the pad 11a (11b) in the backward-run braking are opposite. Therefore, when the forward-run braking and backward-run braking are repeated, for example, in entering a vehicle into a garage in a parking lot, the attitude or rotation of the pad 11a (11b) is changed greatly counterclockwise and clockwise. Therefore, the attitude of the pad 11a (11b) becomes unstable, whereby abnormal sounds called brake squeals are easy to occur and clonk sounds (click sounds) are also easy to occur.

Here, the prior art technology document relating to the invention includes, besides the above-mentioned patent document 1, the patent document 2. The patent document 2 relates to the opposed piston type disk brake apparatus and, specifically, discloses a structure in which a pair of pad pins respectively provided on the circumferential-direction two end portions of a support are used to support a pad movably in the axial direction. However, this structure also raises a similar problem to the structure of the patent document 1.

[Patent Document 1] JP 2006-520449 A
[Patent Document 2] JP 2007-528468 A

SUMMARY

It is therefore one advantageous aspect of the present invention to provide a disk brake pad and a disk brake apparatus which can prevent the occurrence of brake squeals and clonk sounds.

According to one advantage of the invention, there is provided a disk brake pad supported on a pad support member movably in an axial direction of a rotor for a disk brake, comprising:

a lining; and a back plate supporting a back surface of the lining, wherein shapes of opposite sides of the back plate in a circumferential direction of the rotor are asymmetric with respect to the circumferential direction, a first side part of the back plate in the circumferential direction includes a guided portion configured to engage movably in the axial direction with a guiding portion formed in the pad support member, the guided portion is disposed at a position more inward in a radial direction of the rotor than a line of action of a brake tangential force applied in braking, and the guided portion is configured to engage with the guiding portion so as to support a brake tangential force applied toward a second side part of the back plate which is opposite to the first side part in the circumferential direction in braking, and the back plate is configured to support a brake tangential force applied toward the first side part in braking at a portion of the back plate that exists more outward in the radial direction than the line of action of the brake tangential force applied toward the first side part, so that the back plate is configured to receive a moment pressing down the second side part inward in the radial direction in both of forward-run braking and backward-run braking operations.

The guided portion may be a pin insertion portion for inserting a pin used as the guiding portion supported and fixed in the axial direction to the pad support member.

The disk brake pad may be configured such that: the back plate includes a torque transmission surface configured to contact with a part of the pad support member to support the brake tangential force toward the first side part in braking; and the torque transmission surface is disposed at the first side part, and exists more outward in the radial direction than the line of action of the brake tangential force applied toward the first side part.

The second side part of the back plate may include a second guided portion supportable movably in the axial direction on a second guiding portion formed in the pad support member to support the moment applied in braking.

The second guided portion may be a raised ear portion projected in a direction from the first side part toward the second side part from a side edge of the back plate on the second side part.

The second guided portion may be a second pin insertion portion for insertion of a second pin serving as the second guiding portion supported and fixed in the axial direction to the pad support member.

According to another advantage of the invention, there is provided a disk brake apparatus, comprising:

a pad support member;

a pad, supported on the pad support member so as to move in an axial direction of a rotor for the disk brake apparatus, and including a lining and a back plate supporting a back surface of the lining; and a piston for pressing the pad against a surface of the rotor, wherein a first side part of the pad support member in a circumferential direction of the rotor includes a guiding portion, shapes of opposite sides of the back plate in the circumferential direction are asymmetric with respect to the circumferential direction, the first side part of the back plate includes a guided portion, configured to be engaged movably in the axial direction with the guiding portion, the guided portion is disposed at a position more inward in a radial direction of the rotor than a line of action of a brake tangential force applied in braking, and the guided portion is configured to engage with the guiding portion so as to support a brake tangential force applied toward a second side part of the back plate which is opposite to the first side part in the circumferential direction in braking, and the back plate is configured to support a brake tangential force applied toward the first side part in braking at a portion of the back plate that exists more outward in the radial direction than the line of action of the brake tangential force applied toward the first side part, so that the back plate is configured to receive a moment pressing down the second side part inward in the radial direction in both of forward-run and backward-run braking operations.

The disk brake apparatus may be configured such that: the guiding portion is a pin supported and fixed in the axial direction to the pad support member; and the guided portion is a pin insertion portion for inserting the pin therein.

The disk brake apparatus may be configured such that: a part of an edge of the back plate in the second side part is configured to contact with the pad support member so as to support a part of the brake tangential force applied toward the second side part in braking.

The disk brake apparatus may be configured such that: the back plate includes a torque transmission surface which is disposed at the first side part and exists more outward in the radial direction than the line of action of a brake tangential force applied toward the first side part in braking; the pad support member includes a torque receiving surface so that the torque receiving surface is opposed to the torque transmission surface in the circumferential direction; and the torque receiving surface is configured to contact with the torque transmission surface so as to support the brake tangential force applied toward the first side in braking.

The disk brake apparatus may be configured such that: a sandwiched plate made of a metal plate is interposed between the torque transmission surface and the torque receiving surface.

The sandwiched plate may elastically press the pad in a direction from the first side part toward the second side part.

The disk brake apparatus may be configured such that: a pad spring elastically pressing the first side part inward in the radial direction is supported by the pad support member; and the sandwiched plate is integrally provided in a part of the pad spring.

The pad spring may press the pad in a direction to depart from the rotor with respect to the axial direction.

The disk brake apparatus may be configured such that: a pad spring elastically pressing the first side part outward in the radial direction is supported by the pin.

The disk brake apparatus may be configured such that: an outer surface of the pin is configured to contact with an inner surface of the pin insertion portion in a line contact, in braking.

BRIEF DESCRIPTION OF DRAWINGS

FIG. 5A shows the forward-run braking state and FIG. 5B shows the backward-run braking state.

FIG. 6A is a front view, FIG. 6B is a plan view and FIG. 6C is a right side view.

FIG. 11A is a front view, FIG. 11B is a plan view, FIG. 11C is a right side view and FIG. 11D is a perspective view.

DETAILED DESCRIPTION OF EXEMPLIFIED EMBODIMENTS

The disk brake pad of the invention, similarly to the disk brake pad having the above conventional structure, is supported movably in the axial direction on a pad support member (the caliper of the opposed piston type disk brake apparatus, or the support of the floating type disk brake apparatus) in the assembled state of the disk brake apparatus, and includes a lining (friction member) and a metal-made back plate (pressure plate) supporting the back of the lining.

First Embodiment

FIGS. 1 to 7 show a first embodiment of the invention. In this embodiment, description is given of an example in which disk brake pads 18a, 18b of the invention are incorporated in an opposed piston type disk brake apparatus 19 which is a kind of disk brake apparatus.

Figure 1:
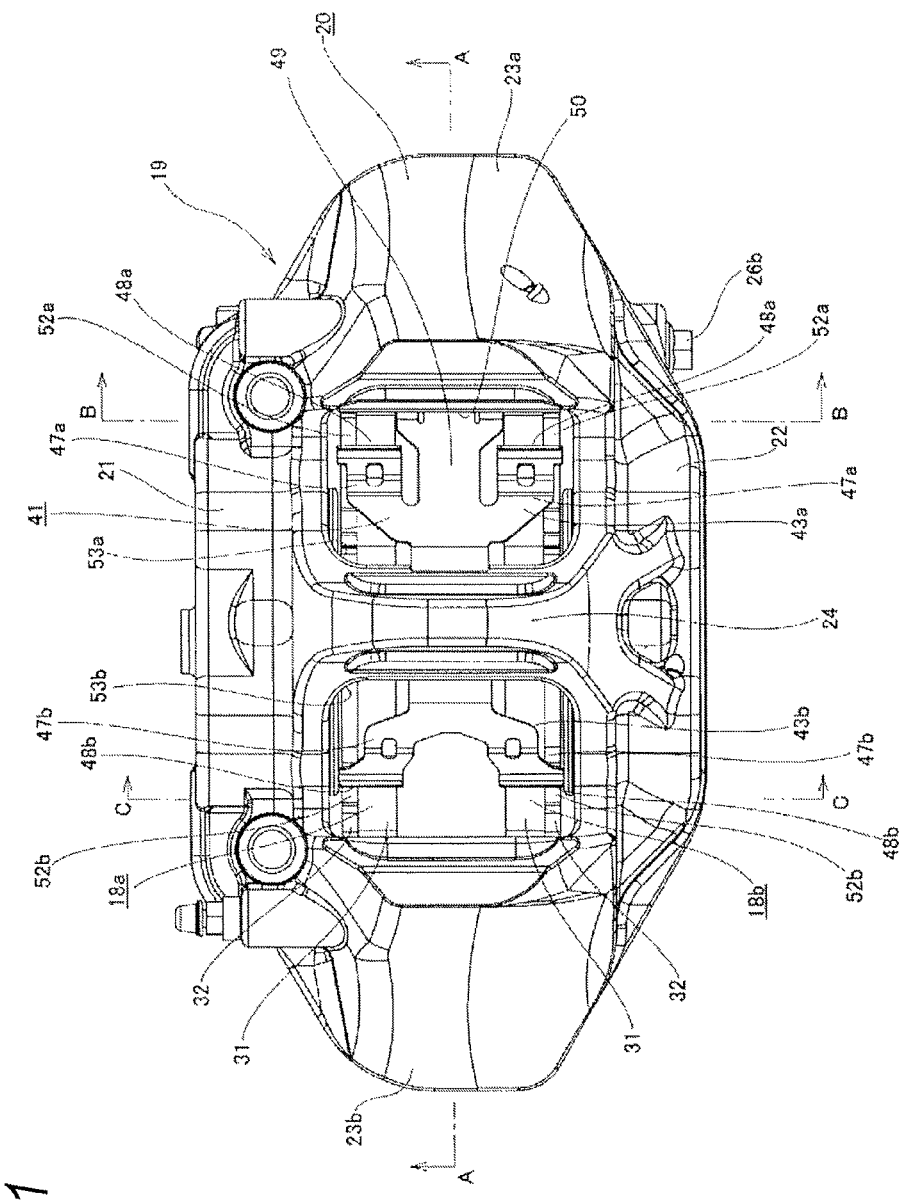
FIG. 1 is an orthogonal projection view of an opposed piston type disk brake apparatus according to a first embodiment of the invention, when viewed from outside in the radial direction.
Figure 2:
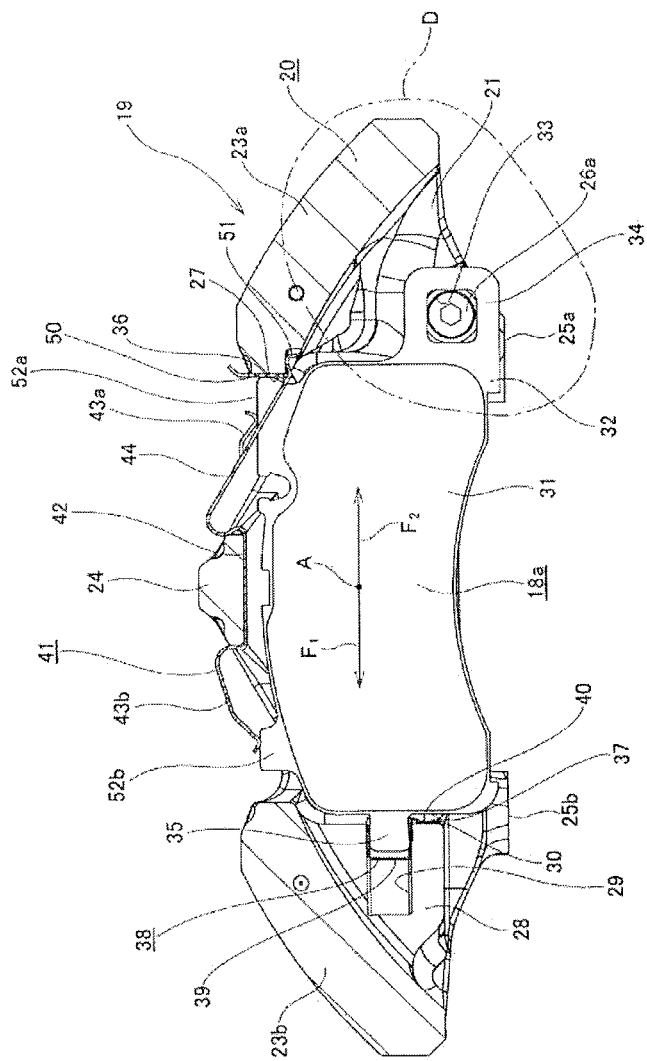
FIG. 2 is a section view of the apparatus taken along the A-A line of FIG. 1.
Figure 3:
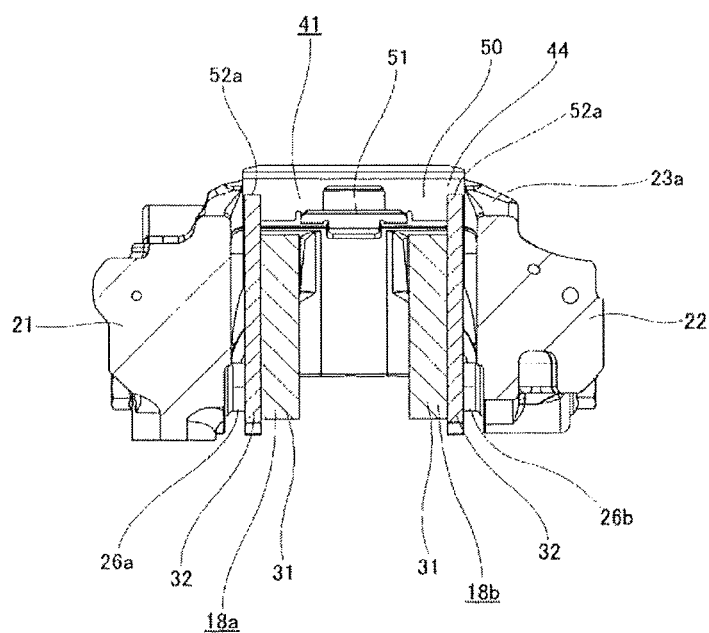
FIG. 3 is a section view of the apparatus taken along the B-B line of FIG. 1.
Figure 4:
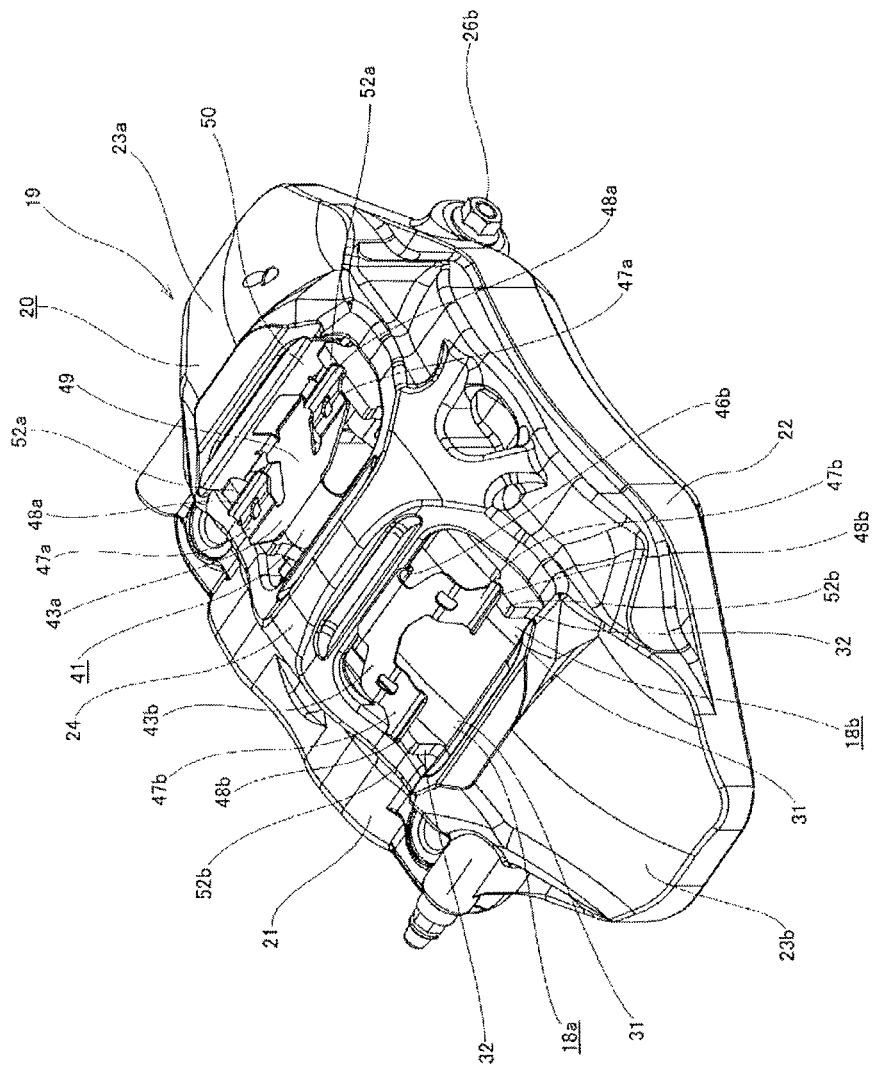
FIG. 4 is a perspective view of the apparatus, when viewed from the outer side thereof and from outside in the radial direction.
Figure 7:
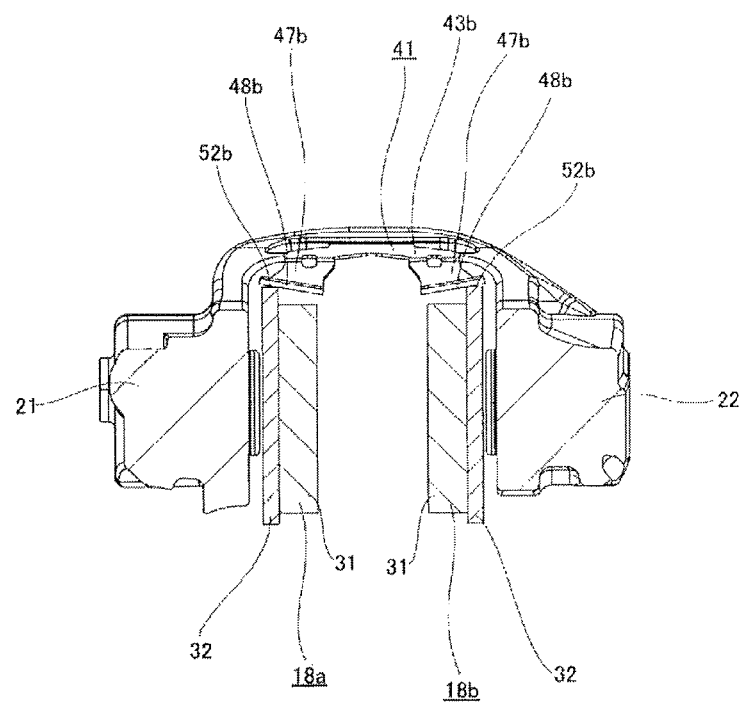
FIG. 7 is a section view taken along the C-C line of FIG. 1.
Figure 17:
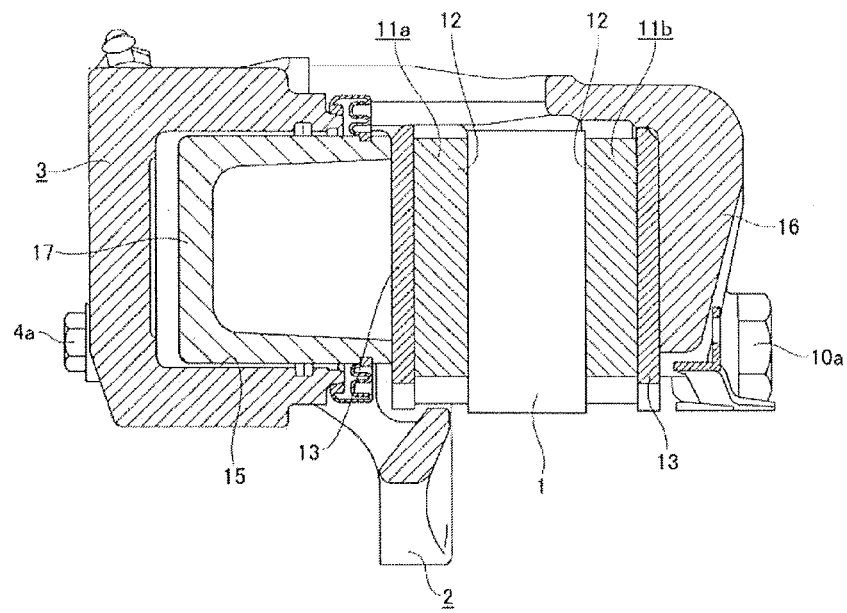
FIG. 17 is a section view taken along the E-E line of FIG. 15.
Figure 18:
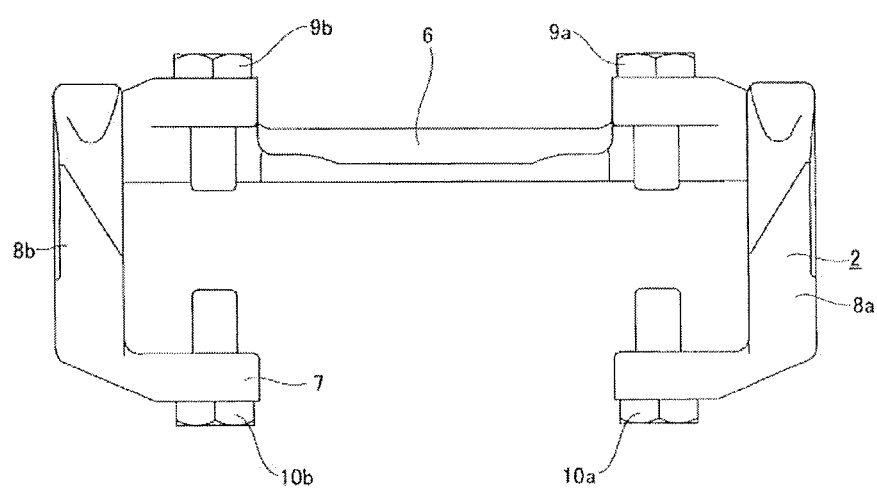
FIG. 18 is a plan view of only a support included in the conventional apparatus.
Figure 19:
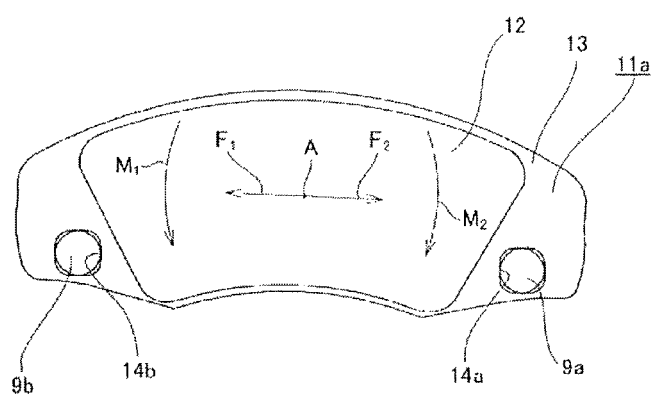
FIG. 19 is a section view taken along the F-F line of FIG. 15 with the support and caliper omitted therefrom.

A caliper 20 constituting the disk brake apparatus 19 supports the inner and outer pads 18a, 18b movably in the axial direction (the vertical direction of FIG. 1, the front and back direction of FIGS. 2 and 5, the horizontal direction of FIGS. 3 and 7). The caliper 20 includes an inner body portion 21 and an outer body portion 22 so disposed as to sandwich a rotor 1 (see FIG. 17) between them, connecting portions 23a, 23b respectively connecting together the circumferential-direction one-side (a first side, the right side of FIGS. 1, 2, 4 and 5, the entrance side in the vehicle forward run) end sections and the circumferential-direction other side (a second side, the left side of FIGS. 1, 2, 4 and 5, the escape side in the vehicle forward run) end sections of the inner and outer bodies 21, 22, and a central bridge portion 24 connecting together the circumferential-direction central sections of the inner and outer bodies 21, 22. And, a portion intervening between the circumferential-direction one-side connecting portion 23a and central bridge portion 24 and a portion intervening between the circumferential-direction other side connecting portion 23b and central bridge portion 24 are respectively formed as window portions 53a, 53b each having a substantially rectangular shape in its plan view. And, within the inner and outer body portions 21, 22, there are provided two inner cylinders and two outer cylinders, respectively. Into these inner and outer cylinders, there are engaged inner pistons and outer pistons oil-tight and shiftably in the axial direction. The thus-structured caliper 20 is supported and fixed to the vehicle body side (knuckle of a suspension apparatus) by a pair of mounting seats 25a, 25b arranged in the inner body portion 21.

A pair of pad pins 26a, 26b are supported and fixed (fixedly provided) concentrically in the axial direction to the radial direction inner end neighboring areas of the circumferential-direction one-side neighboring sections of the inner and outer body portions 21 and 22 in such a manner that their respective leading end portions are projected from the axial-direction inside surfaces of the inner and outer body portions 21 and 22. The portions of the pad pins 26a and 26b projected from the axial-direction inside surfaces of the inner and outer body portions 21 and 22, each having a cylindrical shape with a circular section. The pad pins 26a and 26b, in the forward-run braking, are engaged with through holes 33 (to be discussed later) formed in the pads 18a and 18b to thereby support a brake tangential force F1 applied to the pads 18a and 18b, while they correspond to guiding portions (pins) stated in Claims.

And, of the connecting portion 23a formed to cover the radial direction outer portions of the pad pins 26a and 26b, the end face opposed to the central bridge portion 24 in the circumferential direction is formed as a flat surface-shaped torque receiving surface 27 (existing on a virtual plane perpendicular to the brake tangential force). The torque receiving surface 27, in the backward-run braking, is contacted with a torque transmission surfaces 36 (to be discussed later) formed in the pads 18a and 18b to thereby support a brake tangential force F2 applied to the pads 18a and 18b.

On the other hand, the inner and outer body portions 21 and 22 include, in the mutually opposed axial-direction inside surfaces of the circumferential-direction other end neighboring sections, a pair of guide wall sections 28 each raised in the axial direction and having a substantially fan-like shape in its front view. In the radial direction middle areas of the guide wall sections 28, there are formed guide recess grooves 29 respectively opened in the axial-direction inside surfaces and in the circumferential-direction one-side surfaces. The circumferential-direction one-side surfaces of the guide wall sections include, in their areas existing more inward in the radial direction than the openings of the guide recess grooves 29, flat plane-shaped auxiliary torque receiving surfaces 30 (existing on a virtual plane perpendicular to a brake tangential force (to be discussed later)). The auxiliary torque receiving surfaces 30, in the forward-run braking, when the brake tangential force F1 applied to the pads 18a and 18b becomes excessively large, are contacted with auxiliary torque transmission surfaces 37 (to be discussed later) formed in the pads 18a and 18b to thereby support part of the brake tangential force F1. Here, the guide recess grooves 29 correspond to second guiding portions stated in Claims.

As described above, in the disk brake apparatus 19 of this embodiment, in the circumferential-direction one side portion of the caliper 20, there are provided the two pad pins 26a and 26, whereas, in the circumferential-direction other side portion thereof, there are not provided the pad pins 26a and 26b but there are formed the two guide wall sections 28 (guide recess grooves 29). Therefore, in this embodiment, the shape of the caliper 20 is asymmetric with respect to the circumferential direction.

The two pads 18a and 18b are constituted of linings (friction members) 31, 31 and metal-made back plates (pressure plates) 32, 32 supporting the backs of the linings 31, 31. Also, in this embodiment, the shapes of the circumferential-direction two end portions of the pads 18a, 18a (linings 31 and back plates 32) are asymmetric with respect to the circumferential direction (the shapes of two side portions sandwiching between them a virtual plane including the axis of the rotor 1 and passing through the pad friction center A are asymmetric). That is, in the circumferential-direction one-end portions (a first side part, entrance side end portions) of the back plates 32, 32, there are formed raised sections 34 having the through holes 33 for insertion of the pad pins 26a, 26b, whereas, in the circumferential-direction other end portions (a second side part, escape side end portions) thereof, there are not formed such raised sections nor through holes but there are formed ear sections 35 for engagement with the guide recess grooves 29.

Specifically, the back plates 32, 32 include, in the radial direction inner end sections of the circumferential-direction one-end portions thereof, the substantially rectangular plate-shaped raised sections 34 projected toward one side in the circumferential direction. And, substantially in the central areas of the raised sections 34, specifically, in such areas thereof as exist more inward in the radial direction than the action line of the brake tangential force applied in braking, there are formed the through holes 33 penetrating through them in the axial direction. Each through hole 33 has a substantially rectangular shape and has an inner circumferential surface constituted of four flat surfaces and four partially uneven cylindrical surfaces (chamfered portions) continuously connecting together the mutually circumferentially adjoining flat surfaces. The distance between the paired flat surfaces opposed to each other in the radial direction and the distances between the paired flat surfaces opposed in the circumferential direction are set equal to each other and set larger than the outside diameter dimensions of the pad pins 26a, 26b. On the other hand, in the radial direction middle portions of the side edges of the circumferential-direction other end sides of the back plates 32, 32, there are formed the raised ear sections 35 which project toward the other side in the circumferential direction and are smaller in size than the raised sections 34. The radial direction inside surfaces of the ear sections 35, in braking (in the forward-run braking and backward-run braking), are contacted with the radial direction inside surfaces of the guide recess grooves 29 to thereby support the moment (rotation force) applied to the pads 18a, 18b. Here, the through holes 33 correspond to portions to be guided (pin insertion portions) stated in Claims and, similarly, the ear sections 35 also correspond to a second guided portion.

Further, of the circumferential-direction one-end side edges of the back plates 32, 32, in such areas of the radial direction outer end portions situated more outward in the radial direction than the action line of the brake tangential force applied in braking as are opposed in the circumferential direction to the torque receiving surface 27 of the end face of the connecting portion 23a, there are formed torque transmission surfaces 36 each having a raised curved surface shape. On the other hand, of the circumferential-direction other end side edges of the back plates 32, 32, in such areas existing more inwardly in the radial direction than the areas of the ear sections 35, there are formed auxiliary torque transmission surfaces 37 each having a flat surface-like shape.

In this embodiment, in order for the caliper 20 to support the above-structured pads 18a, 18b movably in the axial direction, the pad pins 26a, 26b are loosely inserted into the through holes 33 of the circumferential-direction one-end portions of the back plates 32, 32 and the ear sections 35 of the circumferential-direction other end portions of the back plate 32, 32 are loosely inserted into the guide recess grooves 29. Also, in this state, the torque transmission surfaces 36 of the circumferential-direction one-end portions of the back plates 32, 32 are disposed opposed to the torque receiving surfaces 27 in the circumferential direction, and the auxiliary torque transmission surfaces 37 of the circumferential-direction other end portions are opposed to the auxiliary torque receiving surfaces 30 in the circumferential direction.

In the above-assembled state, between the circumferential-direction other end side edges of the back plates 32, 32 and guide wall sections 28, there are interposed pad clips 38 each made of an elastic and corrosion-resistant metal plate such as a stainless steel plate. Each pad clip 38 includes an ear insertion portion 39 having a substantially U-shaped section and a pressure receiving portion 40 bent about 90° inward in the radial direction from the lower side section of the ear insertion portion 39. The ear insertion portions 39 are interposed between the ear sections 35 and guide recess grooves 29, and the pressure receiving portions 40 are interposed between the auxiliary torque transmission surfaces 37 and auxiliary torque receiving surfaces 30. Provision of such pad clips 38 can prevent the sliding portions between the back plates 32, 32 and guide wall sections 28 against rust and also against friction.

Figure 6A:
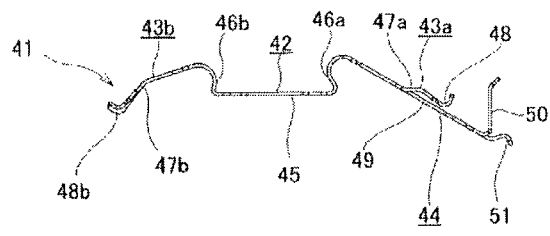
FIGS. 6A to 6C show a pad spring used in the apparatus. Specifically.
Figure 6C:
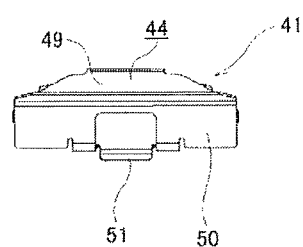
Figure 6B:
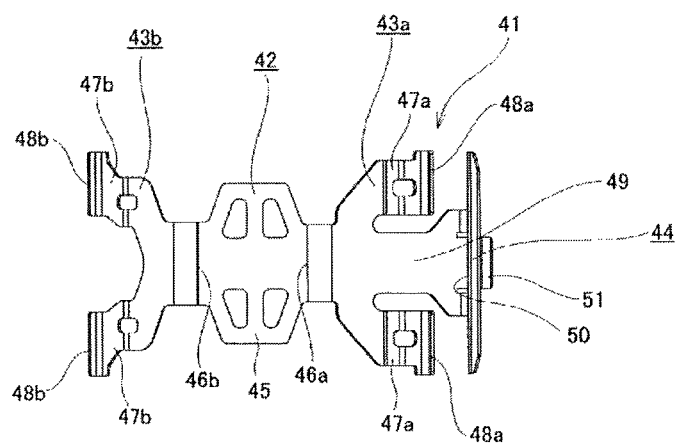

Further, in this embodiment, such a pad spring 41 as shown in FIGS. 6A to 6C is supported on and fixed to the caliper 20. This pad spring 41 is made of an elastic and corrosion-resistant metal plate such as a stainless steel plate, and includes a mounting portion 42 formed in the circumferential-direction middle portion thereof, pressure portions 43a, 43b formed in the circumferential-direction two end portions and having substantially U-like shapes in their plan views, and a portion to be held 44 formed only in the circumferential-direction one end portion and having a substantially T-like shape in its plan view. The mounting portion 42 has a substantially U-shaped section, and includes a substantially rectangular plate-shaped base plate section 45 contactable with the radial direction inside surface of the central bridge portion 24, and a pair of holding plate sections 46a, 46b elastically holding the central bridge portion 24 from both sides in the circumferential direction. Also, the pressure portions 43a, 43b, with the pad spring 41 assembled, are disposed inside the window portions 53a, 53b, and include a pair of pressure arms 47a, 47a (47b, 47b) spaced from each other in the axial direction. The pressure arms 47a, 47a (47b, 47b) include, in their respective leading end portions, pressing portions 48a, 48a (48b, 48b) each having a substantially U-shaped section. Of the two pressure portions 43a, 43b, pressing sections 48b, 48b constituting the circumferential-direction other side pressure portion 43b, as shown in FIG. 7, are inclined inward in the radial direction as they approach each other (as they approach the rotor 1) in the axial direction. The portion to be held 44 is formed continuously with the base ends of the pressure portions 43a (pressure arms 47a, 47a), and includes a flat plate-shaped connecting plate 49 inclined inward in the radial direction as it goes toward its leading end side (circumferential-direction one end side), a sandwiched plate 50 bent outward in the radial direction from the circumferential-direction one end of the connecting plate 49, and an engagement section 51 having a substantially L-shaped section formed by cutting the width-direction (axial-direction) middle portion of the sandwiched plate 50 and bending the thus-cut portion toward one side in the circumferential direction and inward in the radial direction.

Also, with the above-structured pad spring 41 assembled to the central bridge portion 24, using the paired pressing sections 48a, 48a constituting the pressure portion 43a formed on one side in the circumferential direction, shoulder portions 52a, 52a formed in the outer circumferential edges of the circumferential-direction one-end neighboring portions of the back plates 32, 32 are elastically pressed inward in the radial direction. And, using the paired pressing sections 48b, 48b constituting the pressure portion 43b formed on the other side in the circumferential direction, shoulder portions 52b, 52b formed in the outer circumferential edges of the circumferential-direction other end neighboring portions of the back plates 32, 32 are elastically pressed inward in the radial direction and outward in the axial direction. Further, while the engagement section 51 constituting the portion to be held 44 is elastically engaged with the inner circumferential surface of the connecting portion 23a, the sandwiched plate 50 is interposed between the torque receiving surface 27 of the end face of the connecting portion 23a and the torque transmission surfaces 36, 36 on the circumferential-direction one-end sides of the back plates 32, 32.

Figure 5A:
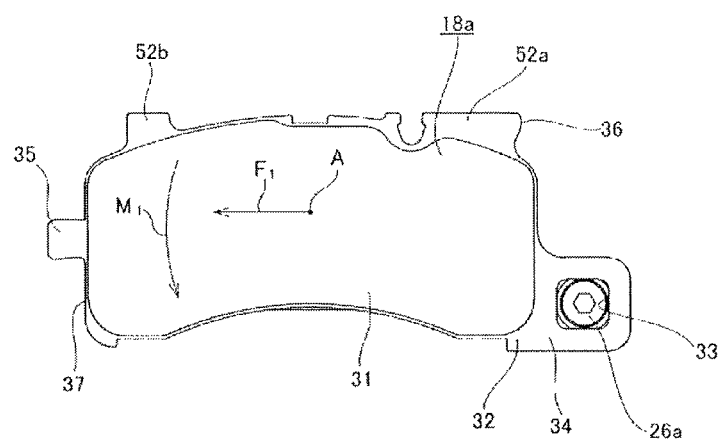
FIGS. 5A and 5B are front views of a pad included in the apparatus. Specifically.

In the above-structured embodiment, in braking, to the pads 18a, 18b, there is generated the moment having the following direction. This is described below specifically with reference to FIGS. 5A and 5B. In the forward-run braking, as shown in FIG. 5A, to the friction surface center (pad effective diameter determined by the diameter, arranging position and the like of a piston) of the lining 31 constituting the pad 18a (18b) A point, there is applied a brake tangential force F1 going toward the other side in the circumferential direction (the left side of FIGS. 5A and 5B, escape side). The pad 18a (18b) is slightly moved toward the other side in the circumferential direction, whereby (the flat surface on the circumferential-direction one side of) the through hole 33 formed in the circumferential-direction one end portion of the back plate 32 is engaged with (the circumferential-direction one end portion of the outer circumferential surface of) the pad pin 26a provided on the circumferential-direction one end neighboring portion of the caliper 20 to support the brake tangential force F1 (a so called pull anchor structure is established). Therefore, in the forward-run braking, to the pad 18a (18b), there is applied the moment M1 having a direction to rotate the pad 18a (18b) counterclockwise, specifically, press down the circumferential-direction other side portion thereof inward in the radial direction.

Figure 5B:
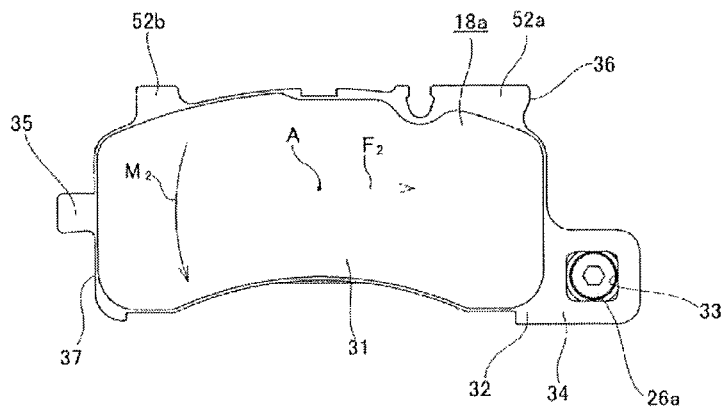

On the other hand, in the vehicle backward-run braking, as shown in FIG. 5B, to the friction surface center A point, in the opposite direction with respect to the circumferential direction to the brake tangential force F1 applied in the forward-run braking, there is applied a brake tangential force F2 directed toward one side (the right side of FIGS. 5A and 5B, entrance side). The pad 18a (18b) is slightly moved toward one side in the circumferential direction, whereby, of the circumferential-direction one side edge portion of the back plate, the torque transmission surface 36 formed more outward in the radial direction than the action line of the brake tangential force F2 is contacted through the sandwiched plate 50 with the torque receiving surface 27 to support the brake tangential force F2 (a so called push anchor structure is established). Therefore, in the backward-run braking, to the pad 18a (18b), there is applied the moment M2 (having the same direction as the moment M1) to rotate the pad 18a (18b) counterclockwise, specifically, press down the circumferential-direction other side portion inward in the radial direction.

As described above, in this embodiment, in the forward- and backward-run braking operations, the directions of the moments M1, M2 applied to the two pads 18a, 18b can be made to coincide with each other. Therefore, for example, even when the forward- and backward-run braking operations are repeated, for example, when entering a vehicle into a garage in a parking lot, the attitudes of the pads 18a, 18b can be kept rotated counterclockwise. Thus, in this embodiment, since the attitudes of the pads 18a, 18b need not be changed, the occurrence of brake squeals and clonk sounds can be prevented.

Also, in this embodiment, when the brake tangential force F1 is excessively large and the pad pins 26a, 26b are thereby elastically deformed, by bringing the auxiliary torque transmission surfaces 37 into contact with the auxiliary torque receiving surface 30, a portion of the brake tangential force F1 can be supported. This can effectively prevent the pad pins 26a, 26b against damage such as breakage.

In this embodiment, using the pad spring 41, the paired shoulder portions 52a, 52b of the back plates 32, 32 constituting the pads 18a, 18b are elastically pressed inward in the radial direction. Therefore, while not in braking, of the inner circumferential surfaces of the through holes 33, the flat surfaces situated on the outside in the radial direction are contacted with the radial direction outer end portions of the outer circumferential surfaces of the pad pins 26a, 26b, and the radial direction inside surfaces of the ear sections 35 are contacted with the radial direction inside surfaces of the guide recess grooves 29. This can stabilize the attitudes of the pads 18a, 18b to thereby prevent the occurrence of brake squeals.

Also, since the paired pressing sections 48b, 48b constituting the pressure portion 43b are inclined as described above, using the two pressing sections 48b, 48b, to the two pads 18a, 18b, there can be applied an elastic force in a direction to depart from the rotor 1 in the axial direction. Therefore, while not in braking, the side surfaces (front surfaces) of the linings 31, 31 can be separated from the two side surfaces of the rotor 1 to thereby prevent them from rubbing against each other.

The portion to be held 44 is formed in part of the pad spring 41 and the sandwiched plate 50 constituting the portion to be held 44 is interposed between the torque transmission surface 36 and torque receiving surface 27. This can prevent the back plates 32, 32 (torque transmission surfaces 36) and caliper 20 (torque receiving surface 27) against rust and also enables the back plates 32, 32 to shift smoothly relative to the caliper 20. Also, since the sandwiched plate 50 is formed integrally with a portion of the pad spring 41, when compared with a structure in which they are provided separately, the number of parts can be reduced and thus the number of assembling steps and management man-hours can also be reduced.

Further, in this embodiment, since the through holes 33 are formed as rectangular holes and the section shapes of the pad pins 26a, 26b are circular, the outer circumferential surfaces of the pad pins 26a, 26b can be contacted in line with the inner circumferential surfaces of the through holes 33. This can stabilize the state of contact of the pad pins 26a, 26b with the through holes 33.

Other structures and operation effects of this embodiment are similar to the above-mentioned conventional structure.

Second Embodiment

Figure 8:
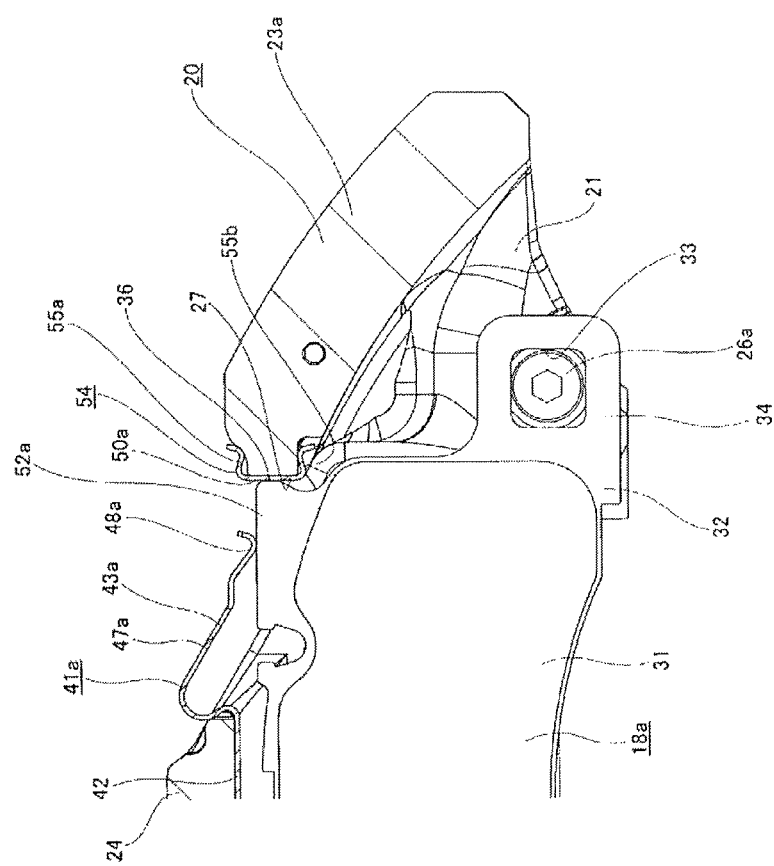
FIG. 8 shows a second embodiment of the invention, corresponding to the right half section of FIG. 2.

FIG. 8 shows a second embodiment of the invention. This embodiment is characterized in that a sandwiched plate 50a to be interposed between the torque transmission surface 36 and torque receiving surface 27 is provided as a portion of a second pad clip 54 separately from the pad spring 41a. Thus, in this embodiment, the pad spring 41a has a shape which omits the portion to be held 44 (connecting plate 49, sandwiched plate 50, engagement section 51) from the pad spring 41 of the first embodiment. That is, the pad spring 41a includes a mounting portion 42 formed in the circumferential-direction middle portion and pressure portions 43a (43b) respectively formed in the circumferential-direction two end portions, each having a substantially U-like shape in its plan view. On the other hand, the second pad clip 54 has a substantially U-shaped section, and includes the sandwiched plate 50a and a pair of holding plates 55a, 55b respectively extended toward the circumferential-direction one side from the radial direction two end portions of the sandwiched plate 50a. By elastically holding the end section of the circumferential-direction one side connecting portion 23a from both sides in the radial direction by the two holding plates 55a, 55b, the second pad clip 54 is mounted on the connecting portion 23a. In the thus-structured embodiment, similarly to the first embodiment, when compared with the structure in which the sandwiched plate is formed integrally with the pad spring for elastically pressing the pad 18a (18b) inward in the radial direction, a metal plate used can be reduced in size and, therefore, this embodiment is advantageous in reducing the cost and weight of the material.

Other structures and operation effects of this embodiment are similar to the first embodiment.

Third Embodiment

Figure 9:
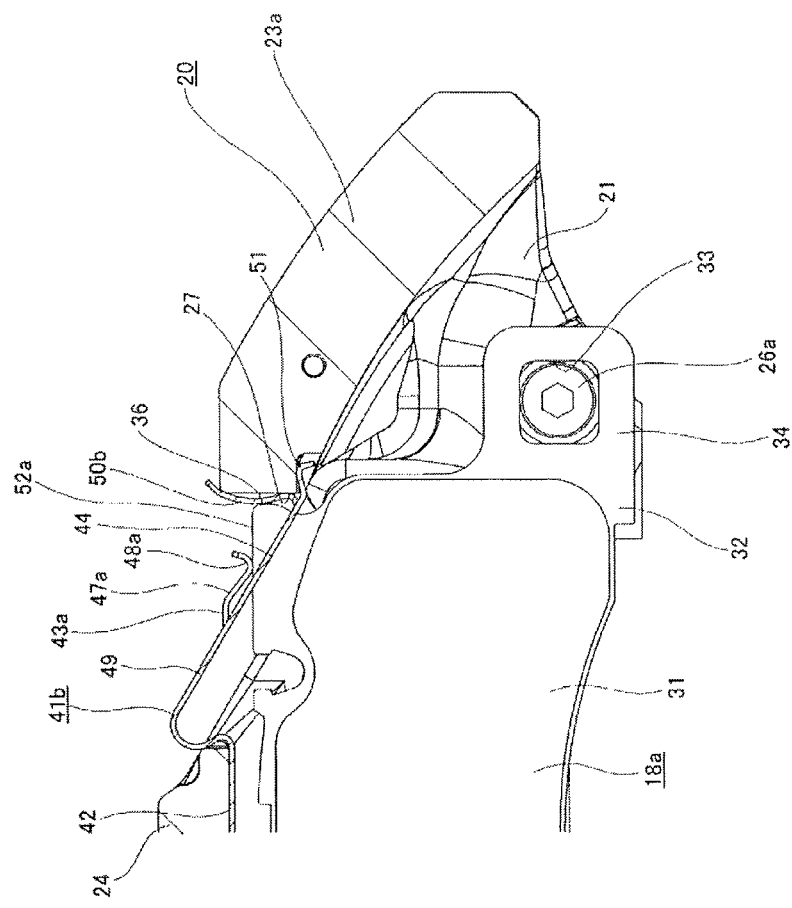
FIG. 9 shows a third embodiment of the invention, similar to FIG. 8.

FIG. 9 shows a third embodiment of the invention. This embodiment is characterized in that the shape of a sandwiched plate 50b provided in part of a pad spring 41b has an arc-shaped section (an arc shape the circumferential-direction other side of which is raised). And, in this embodiment, with the pad 18a (18b) assembled to the caliper 20, the sandwiched plate 50b is elastically crushed in the circumferential direction between the torque receiving surface 27 and torque transmission surface 36. Thus, using the sandwiched plate 50b, each pad 18a (18b) is elastically pressed toward the circumferential-direction other side. In the thus-structured embodiment, since, in the backward-run braking, the torque transmission surface 36 can be prevented from colliding strongly with the torque receiving surface 27, the occurrence of a collision sound can be prevented.

Here, as in this embodiment, in order to prevent the torque transmission surface 36 from colliding strongly with the torque receiving surface 27, the shape of the sandwiched plate may also have a corrugated section or may be a shape inclined relative to the torque receiving surface 27 (a shape in which a clearance between itself and torque receiving surface 27 varies variously in the radial direction).

Other structures and operation effects of this embodiment are similar to the above-mentioned first embodiment.

Fourth Embodiment

Figure 10:
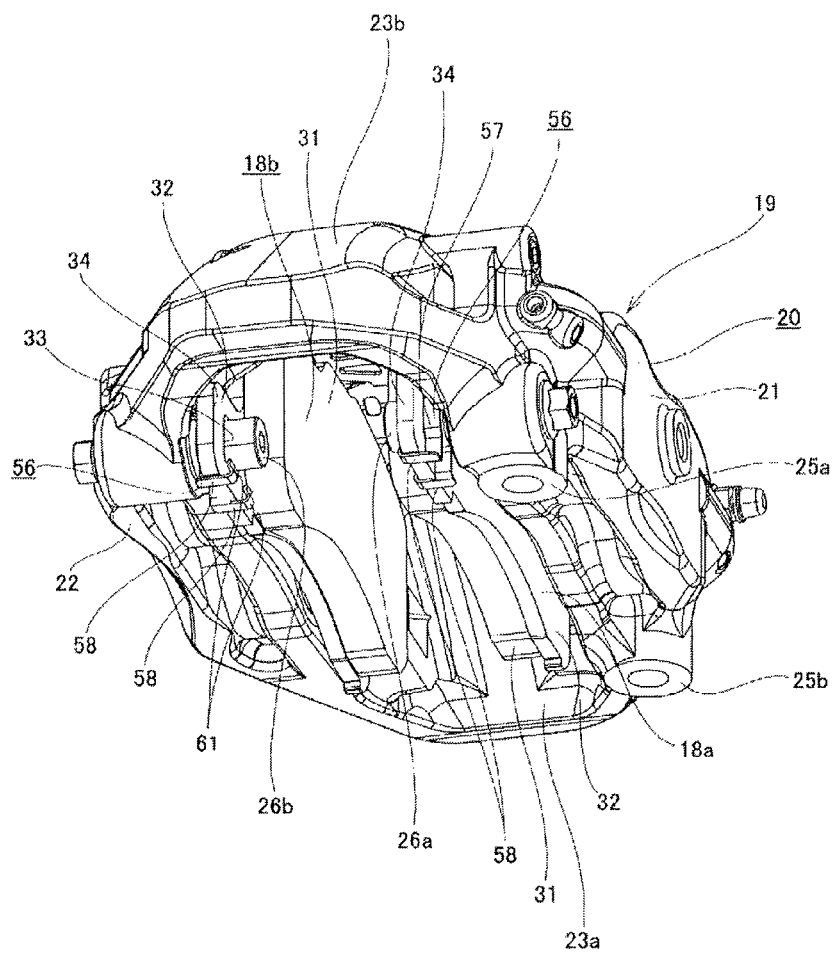
FIG. 10 shows a fourth embodiment of the invention and, specifically, it is a perspective view when the disk brake apparatus is viewed from its inner side and from inward in the radial direction.
Figure 11D:
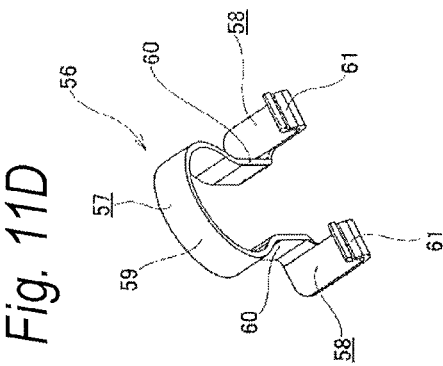
FIGS. 11A to 11D show a pad spring included in the fourth embodiment. Specifically.
Figure 11C:
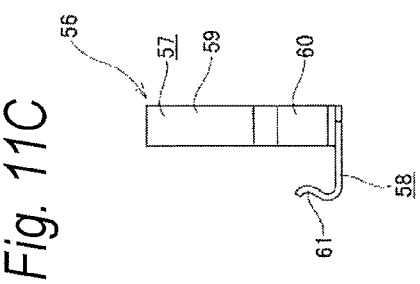
Figure 11B:
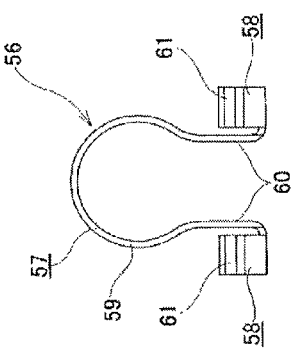
Figure 11A:
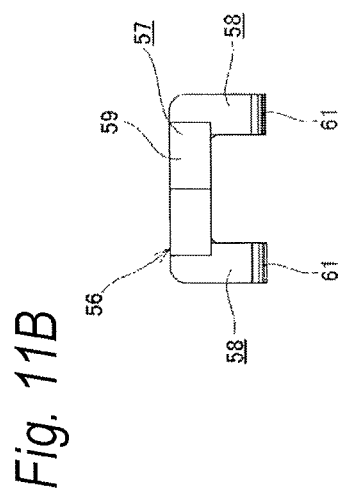

FIGS. 10 and 11 show a fourth embodiment of the invention. In this embodiment, the pad spring 41 is omitted from the structure of the first embodiment and there are provided another two pad springs 56, 56 used to prevent the pads 18a, 18b from shaking while not in braking. Each pad spring 56 is made of an elastic and corrosion-resistant metal plate such as a stainless steel plate, has a substantially Q-like shape in its front view, and includes a mounting portion 57 and a pair of push-up arm portions 58, 58.

The mounting portion 57 has an inverted U-like shape in its front view, and includes a partially arc-shaped base section 59 with its radial direction inner part opened, and a pair of flat plate sections 60, 60 respectively extended inwardly in the radial direction from the two ends of the base section 59. The distance (opening width) between the mutually opposed inside surfaces of the two flat plate sections 60, 60 is smaller than the outside diameter dimension of the pad pins 26a, 26b, while the radius of curvature of the inner circumferential surface of the base section 59 is equal to or slightly larger than ½ of the outside diameter dimension of the pad pins 26a, 26b.

The two push-up arm portions 58, 58 are respectively bent 90° in their mutually opposing directions (plate thick direction) with respect to the circumferential direction from the radial direction inner ends of the two flat plate sections 60, 60 and are also extended in the axial direction. The push-up arm portions 58, 58 include, in their leading ends, retaining sections 61, 61 rising outward in the radial direction.

The above-structured pad springs 56, 56 of this embodiment, as shown in FIG. 10, are interposed respectively between the inner body portion 21 and the inner-side pad 18a and between the outer body portion 22 and the outer-side pad 18b, and are supported by the pad pins 26a, 26b while they straddle over the pad pins 26a, 26b from outside in the radial direction (the pad pins 26a, 26b are inserted inside the base section 59). Also, in this state, the radial direction outside surfaces of the push-up arm portions 58, 58 extended inward in the axial direction from the mounting portion 57 are contacted with the radial direction inside surfaces of the raised sections 34, 34 of the back plates 32, 32 constituting the pads 18a, 18b, and the retaining sections 61, 61 are contacted with the axial-direction inside surfaces of the raised sections 34, 34.

In the above-structured embodiment, the pad springs 56, 56 elastically press the axial-direction inside surfaces of the raised sections 34, 34 outward in the radial direction with the pad pins 26a, 26b as the fulcrums. Therefore, while not in braking, of the inner circumferential surfaces of the through holes 33, 33 formed in the central areas of the raised sections 34, 34, the radial direction side flat surfaces can be elastically pressed against the radial direction inner end portions of the outer circumferential surfaces of the pad pins 26a, 26b. This can stabilize the attitudes of the pads 18a, 18b to thereby prevent the occurrence of brake squeals.

The other structures and operation effects of the fourth embodiment are similar to the first embodiment.

Fifth Embodiment

Figure 12:
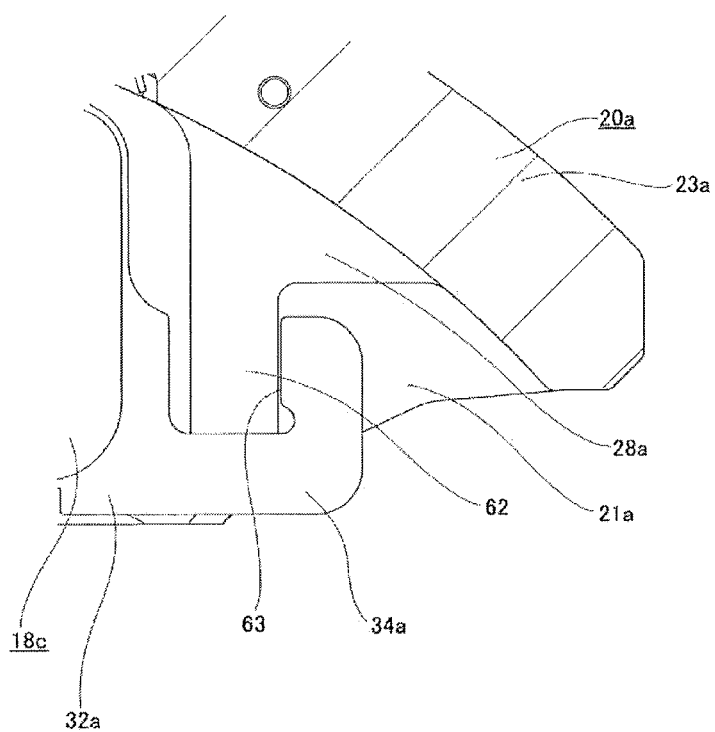
FIG. 12 shows a fifth embodiment of the invention, specifically, an enlarged view of its portion corresponding to the D portion of FIG. 2.

FIG. 12 shows a fifth embodiment of the invention. In this embodiment, differently from the above embodiments, the brake tangential force applied in the forward-run braking is not supported by the engagement between the pad pin and through hole but is supported by the engagement between a raised engagement section 62 and a recessed engagement section 63. Specifically, in this embodiment, in the mutually opposed circumferential-direction one-side (entrance side) axial-direction inside surfaces of the inner body portion 21a and outer body portion 22a constituting the caliper 20a, there are formed axially raised guide wall sections 28a respectively. And, the raised engagement section 62 is formed while it is raised inward in the radial direction from the radial direction inside surfaces of the guide wall sections 28a. In this embodiment, the raised engagement section 62 corresponds to a guiding portion stated in Claims.

On the other hand, in the radial direction inner end of the circumferential-direction one-end portion (entrance side end portion) of the back plate 32a constituting the pad 18c, there is formed a raised section 34a while it projects toward the circumferential-direction one side. And, in the circumferential-direction middle part of the radial direction outside surface of the raised section 34a, there is formed the recessed engagement section 63 recessed inward in the radial direction. In this embodiment, the recessed engagement section 63 corresponds to a guided portion stated in Claims.

In this embodiment, the raised engagement section 62 is loosely inserted into the recessed engagement section 63 from outside in the radial direction, whereby they are engaged. In the thus-structured embodiment, the brake tangential force applied in the forward-run braking can be supported by bringing the circumferential-direction one side surface of the recessed engagement section 63 into contact with the circumferential-direction one side surface of the raised engagement section 62. This can omit the pad pin necessary in the above embodiments. Thus, since the number of parts is reduced, the number of assembling steps and management man-hours can be reduced.

Here, as a modification, for example, it is also possible to employ a structure in which the radial direction inner end of the raised engagement section 62 has a shape bent 90° on one side in the circumferential direction, the radial direction outer end of the circumferential-direction one side surface of the recessed engagement section 63 has a shape raised toward the other side in the circumferential direction, and the raised engagement section 62 and recessed engagement section 63 are engaged with each other in the radial direction.

The other structures and operation effects of the fifth embodiment are similar to the first embodiment.

Sixth Embodiment

Figure 13:
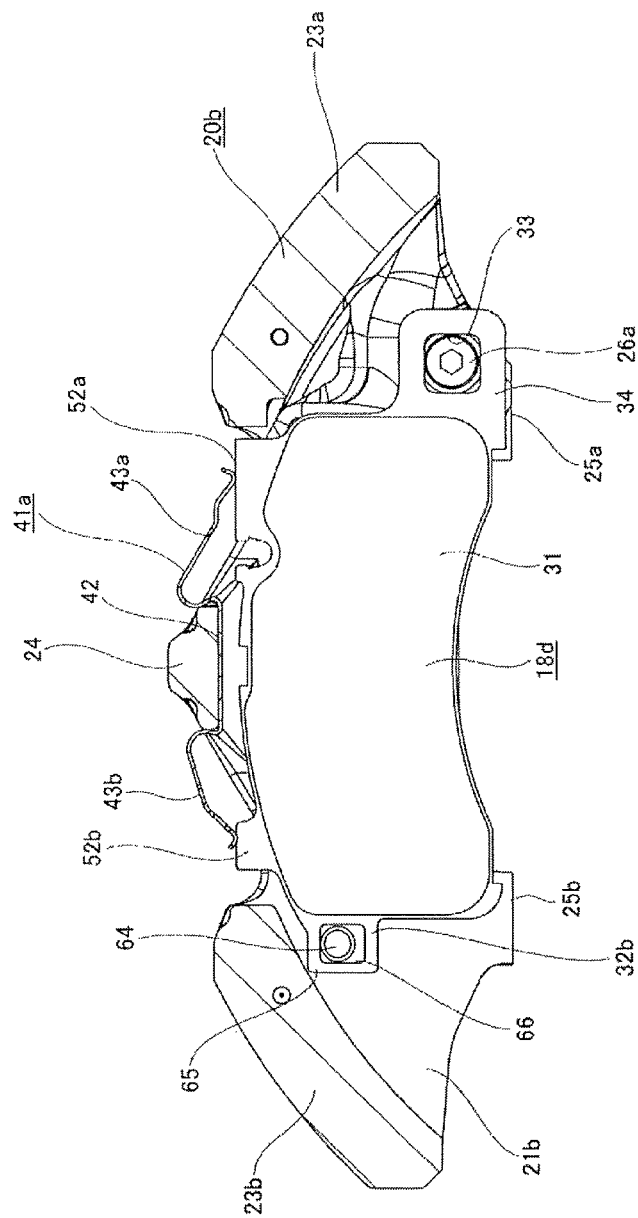
FIG. 13 shows a sixth embodiment of the invention, corresponding to FIG. 2.

FIG. 13 shows a sixth embodiment of the invention. In this embodiment, of the structures of the above embodiments, the second guiding portion and second guided portion are changed. That is, in this embodiment, on the radial direction outer end neighborhoods of the circumferential-direction other end neighborhoods of the inner body portion 21b and outer body portion constituting a caliper 20b, there are supported and fixed a pair of second pad pins 64 (which correspond to the second guiding portions (second pins) stated in Claims) mutually concentrically in the axial direction with their respective leading end portions projected from the axial-direction inside surfaces of the inner body portion 21b and outer body portion.

On the other hand, in the radial direction outer end of the circumferential-direction other end portion (escape side end portion) of a back plate 32b constituting a pad 18d, there is formed a substantially rectangular plate-shaped raised section 65 raised toward the other side in the circumferential direction. And, in such area of the substantially central section of the raised section 65 as exists more outward in the radial direction than the action line of a brake tangential force applied in braking, there is formed a second through hole 66 (which corresponds to the second guided portion (a second pin insertion portion) stated in Claims) penetrating through it in the axial direction and having a substantially rectangular-shaped section.

And, in this embodiment, in order to support the above-structured pad 18d movably in the axial direction on the caliper 20b, the pad pin 26a (26b) is loosely inserted into the through hole 33 of the circumferential-direction one end portion of the back plate 32b and the second pad pin 64 is loosely inserted into the second through hole 66 of the circumferential-direction other end portion of the back plate 32b.

In the above-structured embodiment, in the vehicle backward-run braking, when the pad 18d is slightly moved toward one side in the circumferential direction, the second through hole 66 and second pad pin 64 are engaged with each other to thereby support the brake tangential force F2 (see FIG. 5B) (a so called pull anchor structure is established). Therefore, in the backward-run braking, to the pad 18d, there can be applied the moment M2 to rotate the pad 18d counterclockwise. Also, the moment (rotation force) applied in braking is supported by the engagement between the second through hole 66 and second pad pin 64.

As described above, when the brake tangential force applied in the backward-run braking is supported by the engagement between the second through hole 66 and second pad pin 64, the sandwiched plate used in the structures of the above embodiments need not be interposed between the caliper 20b and the circumferential-direction one end portion of the back plate 32b constituting the pad 18d. Therefore, in this embodiment, a pad spring 41a similar to the second embodiment can be used. However, when there is employed a structure where the engagement between the second through hole 66 and second pad pin 64 supports only the moment applied in braking but does not support the brake tangential force applied in the backward-run braking, similarly to the structures of the above embodiments, a sandwiched plate made of a metal plate can be interposed between the caliper 20b (torque receiving surface 27) and the circumferential-direction one end portion (torque transmission surface 36) of the back plate 32b constituting the pad 18d.

The other structures and operation effects of the sixth embodiment are similar to the first embodiment.

Seventh Embodiment

Figure 14:
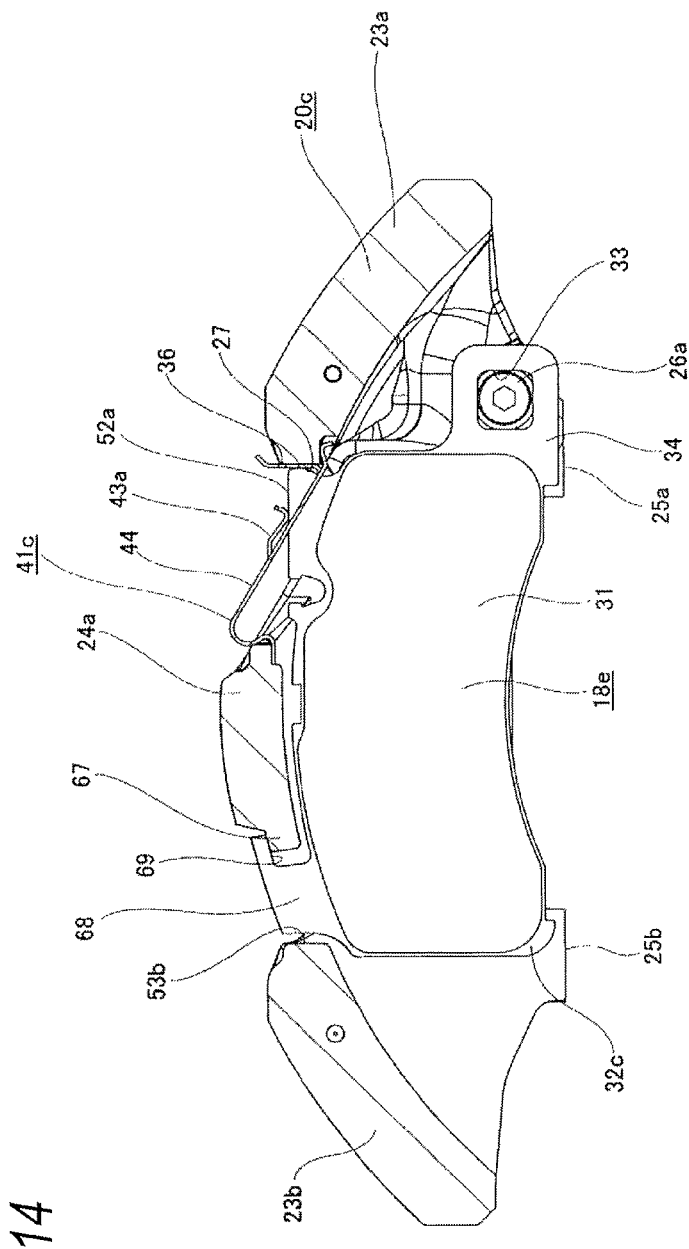
FIG. 14 shows a seventh embodiment of the invention, corresponding to FIG. 2.
Figure 15:
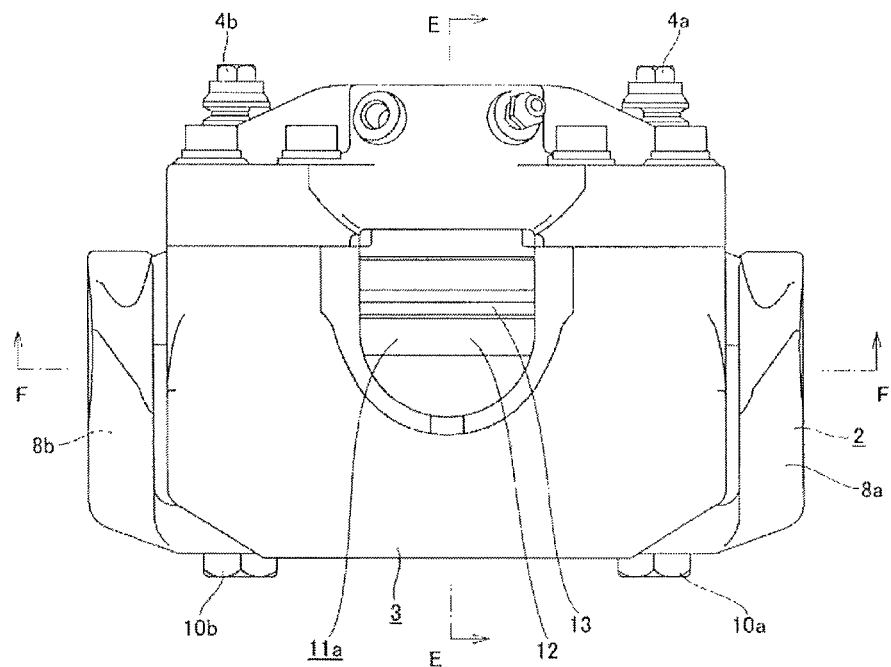
FIG. 15 is a plan view of a disk brake apparatus having a conventional structure.
Figure 16:
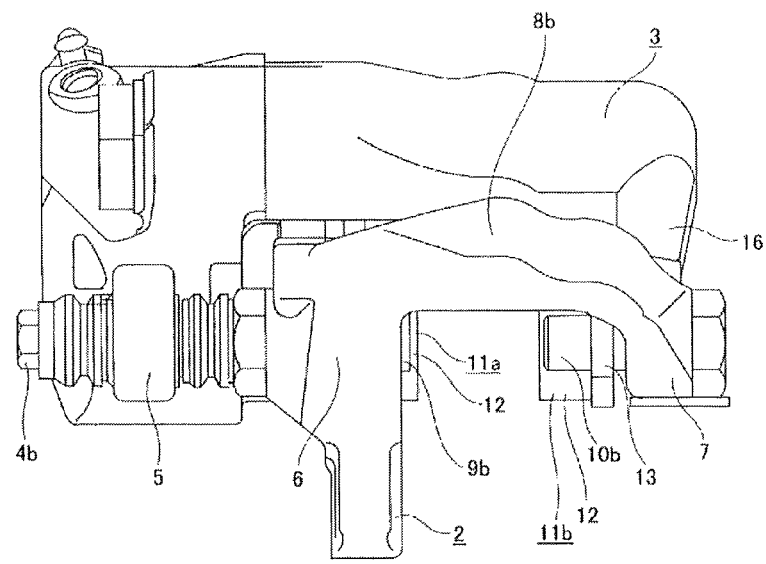
FIG. 16 is a left side view of the conventional apparatus.

FIG. 14 shows a seventh embodiment of the invention. In this embodiment as well, similarly to the sixth embodiment, the structures of the second guiding portion and second guided portion are changed. That is, in this embodiment, in such end face of the central bridge portion 24a constituting a caliper 20c as is opposed to the circumferential-direction other side connecting portion 23b, there is formed a raised engagement section 67 with its radial direction inner end raised toward the other side in the circumferential direction.

On the other hand, in the outer circumferential edge of the circumferential-direction other end portion (escape side end portion) of a back plate 32c constituting a pad 18e, there is formed a projecting portion 68 projecting outwardly in the radial direction. And, the projecting portion 68 is advanced into a window portion 53b formed between the central bridge portion 24a and connecting portion 23b. Also, in such end face of the projecting portion 68 as is opposed to the central bridge portion 24a, there is formed a recessed engagement section 69 with its radial direction inner end recessed toward the other side in the circumferential direction.

In this embodiment, in order for the caliper 20c to support the above-structured pad 18e movably in the axial direction, the pad pin 26a (26b) is loosely inserted into the through hole 33 of the circumferential-direction one end portion of the back plate 32c and the recessed engagement section 69 of the projecting portion 68 of the back plate 32c is engaged with the raised engagement section 67 of the central bridge portion 24a.

In the above-structured embodiment, the moment applied in braking is supported by bringing the radial direction outside surfaces of the raised engagement section 67 into contact with the radial direction outside surface of the recessed engagement section 69 in the radial direction. Also, in this embodiment, in order to advance the projecting portion 68 into the window portion 53b, as a pad spring 41c, there is used a pad spring having a shape in which the circumferential-direction other side half sections of the circumferential-direction other side pressure portion and mounting portion are omitted.

The other structures and operation effects of the seventh embodiment are similar to the first and sixth embodiments.

The invention is not limited to the opposed piston type disk brake apparatus described in the embodiments but can also be applied to such a floating caliper type disk brake apparatus as shown in FIGS. 15 to 18. Also, in enforcing the invention, the shape of the through hole formed in the circumferential-direction one end portion of the back plate constituting the pad is not limited to such a rectangular shape as shown in the embodiments (except for the fifth embodiment) but may also be a circular shape (round hole). Instead of the through hole, there can also be employed a notch including a discontinuous portion partially continuous with the outside (opened). Further, the invention is not limited to such structure as described in the embodiments that the disk brake apparatus is assembled in the direction where the circumferential-direction one side serves as the entrance side in the vehicle forward run and the circumferential-direction other side serves as the escape side in the vehicle forward run, but can also be applied to a structure that the disk brake apparatus is assembled in the direction where the circumferential-direction one side serves as the escape side in the vehicle forward run and the circumferential-direction other side serves as the entrance side in the vehicle forward run.

The above-structured disk brake pad and disk brake apparatus of the invention can prevent the occurrence of brake squeals and clonk sounds.

Specifically, in the invention, the back plate constituting the pad includes, in the circumferential-direction one end, the guided portion existing more inward in the radial direction than the line of action of a brake tangential force applied in braking. The guided portion is engaged with the guide section of the pad support member to support a brake tangential force applied toward the other side in the circumferential direction in braking. Thus, in braking while the rotor is rotating from the circumferential-direction one side of the pad toward the circumferential-direction other side (the circumferential-direction one side provides the entrance side and the circumferential-direction other side provides the escape side), there is applied the moment to press down the circumferential-direction other side portion of the back plate constituting the pad inward in the radial direction.

On the other hand, in braking while the rotor is rotating from the circumferential-direction other side of the pad to the circumferential-direction one side (the circumferential-direction other side provides the entrance side and the circumferential-direction one side provides the escape side), a brake tangential force acting toward one side in the circumferential direction is supported by such portion of the back plate as exists more outward in the radial direction than the action line of the tangential force. Thus, similarly, there is applied the moment to press down the circumferential-direction other side portion of the back plate inward in the radial direction.

Thus, according to the invention, the direction of the moment applied to the pad in the forward-run braking can be made coincide with that of the moment in the backward-run braking.

Therefore, even when the forward-run and backward-run braking operations are enforced repeatedly, the attitude of the pad is not varied greatly, thereby being able to prevent the occurrence of brake squeals and clonk sounds.

What is claimed is:

1. A disk brake pad supported on a pad support member movably in an axial direction of a rotor for a disk brake, comprising:
   a lining; and
   a back plate supporting a back surface of the lining,
   wherein shapes of opposite sides of the back plate in a circumferential direction of the rotor are asymmetric with respect to the circumferential direction,
   a first side part of the back plate in the circumferential direction includes a guided portion configured to engage movably in the axial direction with a guiding portion formed in the pad support member, the guided portion is disposed at a position more inward in a radial direction of the rotor than a line of action of a brake tangential force applied in braking,
   the guided portion is configured to engage with the guiding portion so as to support a brake tangential force applied toward a second side part of the back plate which is opposite to the first side part in the circumferential direction in braking, and the back plate is configured to support a brake tangential force applied toward the first side part in braking at a portion of the first side part of the back plate that exists more outward in the radial direction than the line of action of the brake tangential force applied toward the first side part, so that the back plate is configured to receive a moment pressing down the second side part inward in the radial direction in both of forward-run braking and backward-run braking operations, and the guided portion is a pin insertion portion for inserting a pin used as the guiding portion supported and fixed in the axial direction to the pad support member.

2. The disk brake pad according to claim 1, wherein
the back plate includes a torque transmission surface configured to contact with a part of the pad support member to support the brake tangential force toward the first side part in braking, and the torque transmission surface is disposed at the first side part, and exists more outward in the radial direction than the line of action of the brake tangential force applied toward the first side part.

3. The disk brake pad according to claim 1, wherein
the second side part of the back plate includes a second guided portion supportable movably in the axial direction on a second guiding portion formed in the pad support member to support the moment applied in braking.

4. The disk brake pad according to claim 3, wherein
the second guided portion is a raised ear portion projected in a direction from the first side part toward the second side part from a side edge of the back plate on the second side part.

5. The disk brake pad according to claim 3, wherein
the second guided portion is a second pin insertion portion for insertion of a second pin serving as the second guiding portion supported and fixed in the axial direction to the pad support member.

6. A disk brake apparatus, comprising:
a pad support member;
a pad, supported on the pad support member so as to move in an axial direction of a rotor for the disk brake apparatus, and including a lining and a back plate supporting a back surface of the lining; and
a piston for pressing the pad against a surface of the rotor,
wherein a first side part of the pad support member in a circumferential direction of the rotor includes a guiding portion,
shapes of opposite sides of the back plate in the circumferential direction are asymmetric with respect to the circumferential direction,
the first side part of the back plate includes a guided portion, configured to be engaged movably in the axial direction with the guiding portion, the guided portion is disposed at a position more inward in a radial direction of the rotor than a line of action of a brake tangential force applied in braking,
the guided portion is configured to engage with the guiding portion so as to support a brake tangential force applied toward a second side part of the back plate which is opposite to the first side part in the circumferential direction in braking, and the back plate is configured to support a brake tangential force applied toward the first side part in braking at a portion of the part of the back plate that exists more outward in the radial direction than the line of action of the brake tangential force applied toward the first side part, so that the back plate is configured to receive a moment pressing down the second side part inward in the radial direction in both of forward-run and backward-run braking operations, the guiding portion is a pin supported and fixed in the axial direction to the pad support member, and the guided portion is a pin insertion portion for inserting the pin therein.

7. The disk brake apparatus according to claim 6, wherein
a part of an edge of the back plate in the second side part is configured to contact with the pad support member so as to support a part of the brake tangential force applied toward the second side part in braking.

8. The disk brake apparatus according to claim 6, wherein
the back plate includes a torque transmission surface which is disposed at the first side part and exists more outward in the radial direction than the line of action of a brake tangential force applied toward the first side part in braking, the pad support member includes a torque receiving surface so that the torque receiving surface is opposed to the torque transmission surface in the circumferential direction, and the torque receiving surface is configured to contact with the torque transmission surface so as to support the brake tangential force applied toward the first side in braking.

9. The disk brake apparatus according to claim 8, wherein
a sandwiched plate made of a metal plate is interposed between the torque transmission surface and the torque receiving surface.

10. The disk brake apparatus according to claim 9, wherein
the sandwiched plate elastically presses the pad in a direction from the first side part toward the second side part.

11. The disk brake apparatus according to claim 9, wherein
a pad spring elastically pressing the first side part inward in the radial direction is supported by the pad support member, and the sandwiched plate is integrally provided in a part of the pad spring.

12. The disk brake apparatus according to claim 11, wherein
the pad spring presses the pad in a direction to depart from the rotor with respect to the axial direction.

13. The disk brake apparatus according to claim 6, wherein
a pad spring elastically pressing the first side part outward in the radial direction is supported by the pin.

14. The disk brake apparatus according to claim 6, wherein
an outer surface of the pin is configured to contact with an inner surface of the pin insertion portion in a line contact, in braking.

* * * * *